(12) United States Patent
Yang et al.

(10) Patent No.: US 10,984,596 B2
(45) Date of Patent: Apr. 20, 2021

(54) SYSTEMS AND METHODS FOR ENRICHING A VIRTUAL REALITY TOUR

(71) Applicant: Ke.com (Beijing)Technology Co., Ltd., Beijing (CN)

(72) Inventors: Yuke Yang, Beijing (CN); Xing Du, Beijing (CN)

(73) Assignee: KE.COM (BEIJING)TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/425,918

(22) Filed: May 29, 2019

(65) Prior Publication Data
US 2019/0371061 A1    Dec. 5, 2019

(30) Foreign Application Priority Data

May 30, 2018  (CN) .......................... 201810538113.5
May 30, 2018  (CN) .......................... 201810540328.0

(51) Int. Cl.
*G06T 19/00*    (2011.01)
*G06Q 50/16*    (2012.01)
(Continued)

(52) U.S. Cl.
CPC ........ *G06T 19/003* (2013.01); *G06F 3/04815* (2013.01); *G06Q 30/0625* (2013.01); *G06Q 50/167* (2013.01)

(58) Field of Classification Search
CPC .............. G06T 19/003; G06F 3/04815; G06Q 30/0625; G06Q 50/167
(Continued)

(56) References Cited

U.S. PATENT DOCUMENTS 7,834,883 B2 * 11/2010 Adams .................. G06Q 30/02
                                                   345/419
9,396,260 B2    7/2016 Castelli et al.
(Continued)

FOREIGN PATENT DOCUMENTS

CN    101116338 A    1/2008
CN    105210117 A    12/2015
(Continued)

OTHER PUBLICATIONS

First Office action issued in related Chinese Application No. 201810538113.5, dated Jun. 17, 2019, 6 pages.
(Continued)

*Primary Examiner* — Hai Tao Sun
(74) *Attorney, Agent, or Firm* — Bayes PLLC (57) ABSTRACT

Systems and methods are provided for enriching an in-door virtual reality (VR) tour. An exemplary system may include a communication interface configured to receive input from a user, a memory storing computer-readable instructions, and at least one processor coupled to the communication interface and the memory. The computer-readable instructions, when executed by the at least one processor, may cause the at least one processor to perform operations. The operations may include detecting, through the communication interface, a trigger input by the user. In response to the detection of the trigger, the operations may include receiving, through the communication interface, enrichment data input by the user. The operations may also include determining a functional space based on a user indicator representing the user in the in-door VR tour. The operations may further include associating the enrichment data with the functional space.

15 Claims, 6 Drawing Sheets

(51) Int. Cl.
*G06Q 30/06* (2012.01)
*G06F 3/0481* (2013.01)

(58) Field of Classification Search
USPC .......................................................... 345/419
See application file for complete search history.

(56) References Cited

U.S. PATENT DOCUMENTS

| | | | |
|---|---|---|---|
| 9,600,800 B2 | 3/2017 | Tomkins et al. | |
| 2008/0252640 A1* | 10/2008 | Williams | G06T 19/003 |
| | | | 345/420 |
| 2018/0075652 A1* | 3/2018 | Kim | G06T 3/0062 |

FOREIGN PATENT DOCUMENTS

| | | | |
|---|---|---|---|
| CN | 106021540 A | 10/2016 | |
| CN | 107301679 A | 10/2017 | |
| CN | 107346560 A | 11/2017 | |
| CN | 108073286 A | 5/2018 | |

OTHER PUBLICATIONS

First Office action issued in related Chinese Application No. 201810540328.0, dated Jun. 17, 2019, 7 pages.

\* cited by examiner

SYSTEMS AND METHODS FOR ENRICHING A VIRTUAL REALITY TOUR

RELATED APPELLATIONS

This application claims the benefits of priority to Chinese Application Nos. CN 201810538113.5, filed May 30, 2018 and CN 201810540328.0, filed May 30, 2018. The entire contents of the above-identified applications are expressly incorporated herein by reference.

TECHNICAL FIELD

The present application relates to virtual reality (VR) technologies. More specifically, the present application relates to systems and methods for enriching a VR tour in an in-door environment.

BACKGROUND

Conventional real estate sales rely on distribution of paper pamphlets and advertisement through newspaper and other paper-based media channels. These off-line advertising methods suffer from low efficiency and limited customer base. Promoting real estate sales on-line has become popular thanks to the proliferation of Internet and network-connected mobile devices. Real estate information augmentation services may collect for-sale information and distribute such information to subscribers through mailing list or publish the information on websites or mobile app portals. While the on-line approach improves the timeliness and reaches a larger audience, the contents delivered on-line remain largely the same as their off-line counterparts. For example, a typical on-line real estate advertisement includes a set of photos of the subject property and some textual descriptions. In order to gain more detailed knowledge about the property, such as specific parts not covered or insufficiently depicted by the photos, a visit to the property would normally be required. In addition, the textual descriptions are often provided in the form of a laundry list, lacking context to specific features of the underlying real estate property.

Embodiments of the present disclosure improve the user experience in exploring and virtually touring real estate properties by providing VR tours enriched by multimedia contents to provide contextual information.

SUMMARY

In one aspect, a system is provided for providing an in-door VR tour. The system may include a communication interface configured to receive input from a user, a memory storing computer-readable instructions, and at least one processor coupled to the communication interface and the memory. The computer-readable instructions, when executed by the at least one processor, may cause the at least one processor to perform operations. The operations may include detecting, through the communication interface, a trigger input by the user. In response to the detection of the trigger, the operations may include receiving, through the communication interface, enrichment data input by the user. The operations may also include determining a functional space based on a user indicator representing the user in the in-door VR tour. The operations may further include associating the enrichment data with the functional space.

In another aspect, a method is provided for enriching an in-door VR tour. The method may include detecting, through a communication interface, a trigger input by a user. In response to the detection of the trigger, the method may include receiving, through the communication interface, enrichment data input by the user. The method may also include determining, by at least one processor, a functional space based on a user indicator representing the user in the in-door VR tour. The method may further include associating, by the at least one processor, the enrichment data with the functional space.

In a further aspect, a non-transitory computer-readable medium is provided. The non-transitory computer-readable medium may store instructions that, when executed by at least one processor, cause the at least one processor to perform a method for enriching an in-door VR tour. The method may include detecting, through a communication interface, a trigger input by a user. In response to the detection of the trigger, the method may include receiving, through the communication interface, enrichment data input by the user. The method may also include determining a functional space based on a user indicator representing the user in the in-door VR tour. The method may further include associating the enrichment data with the functional space.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
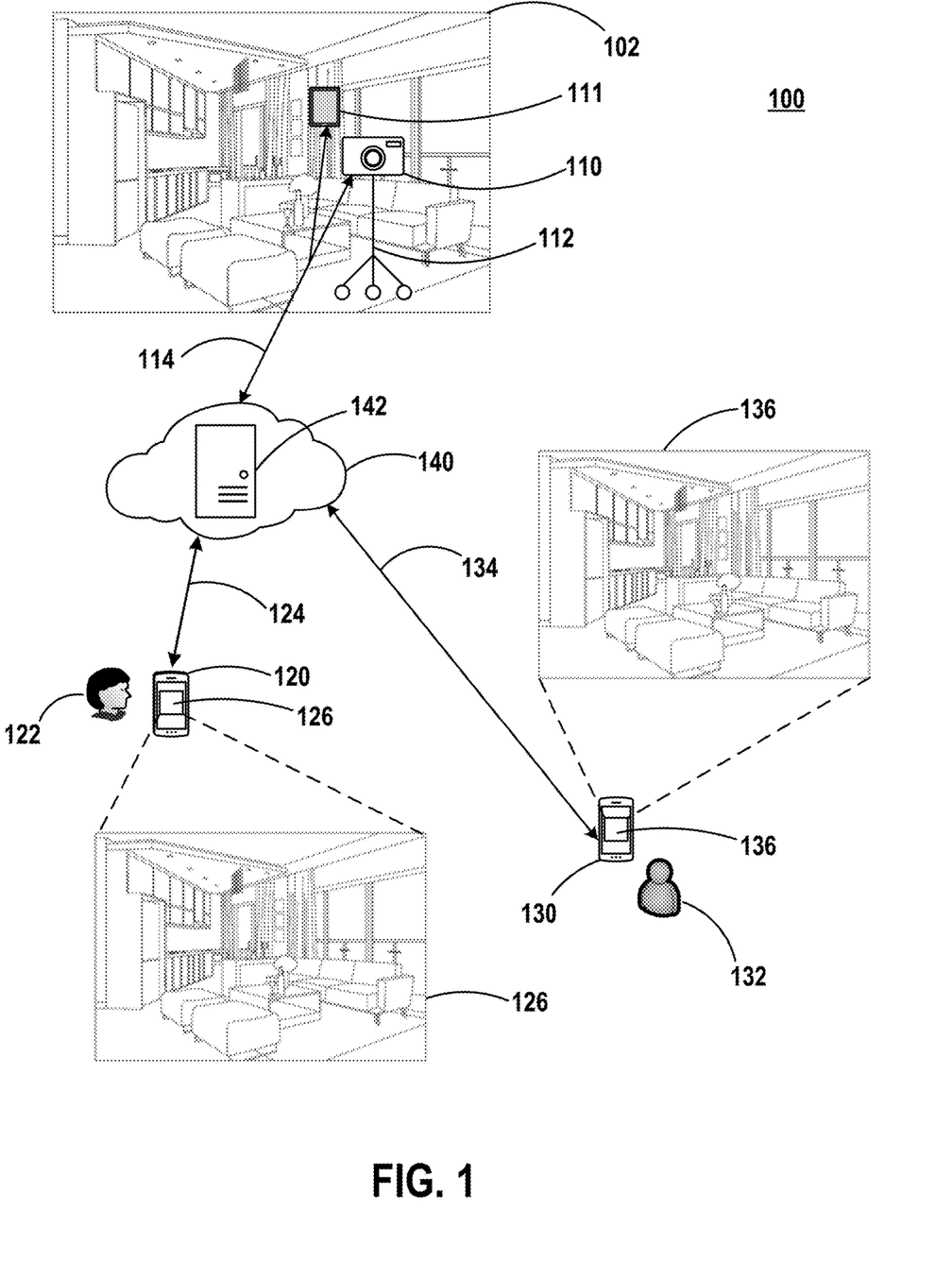
FIG. 1 illustrates an exemplary system for providing an in-door VR tour, according to embodiments of the disclosure.

FIG. 1 illustrates an exemplary system 100 for providing an in-door VR tour, according to embodiments of the disclosure. System 100 may include a data capturing portion, a data processing portion, and a VR displaying portion. The data capturing portion may include a camera device 110 configured to capture images of an in-door environment 102, which may include enclosed or partially-enclosed space, such as one or more rooms of a residential or commercial real estate property, passenger or cargo space of a vessel (e.g., car, truck, recreational vehicle, trailer, train, ship, plane, etc.), a hall/suite/room of a cultural, political, industrial, or business establishment, etc. In-door environment 102 may include fixtures (e.g., lights, fans, cabinets, closets, etc.), structures (furniture, decorations, etc.), or other features. In some embodiments, in-door environment 102 may include part of a real estate property that may be for sale or rent. For example, the example shown in FIG. 1 depicts a living room of an apartment, house, or office building. Embodiments of the disclosure may create a 3D model of in-door environment 102 to facilitate the provision of a VR tour of the in-door environment. For example, multiple images of in-door environment 102 may be captured, aligned, and combined to recreate or reconstruct a 3D representation of the in-door environment 102. In some embodiments, range, depth, or distance information may also be acquired to aid in creating the 3D model.

In some embodiments, camera device 110 may be configured to capture images of in-door environment 102. The image data captured by camera device 110 may include static images or photos, motion images or videos, 3D images including range, depth, or distance information, or any combination thereof. For example, camera device 110 may include a specially designed VR camera or 3D camera configured to capture 3D images having range/depth/distance information. In this case, camera device 110 may include multiple lenses. One or more of the lenses may be configured to capture the color or intensity information, while one or more other lenses may be configured to capture the range/depth/distance information. The color/intensity information and range/depth/distance information may be stored locally in a memory of camera device 110, transmitted to an accompanying mobile device (111) located in the proximity to the camera device, and/or streamed to a remote server, such as server 142 located in a cloud computing service 140, which will be discussed in greater detail below. For example, when mobile device 111 is used, image data captured by camera device 110 may be transmitted to mobile device 111, where the image data may be preprocessed, including, for example, aligning and/or combining point cloud data captured at different shooting angles or positions, adding one or more feature points such as those on windows or mirrors, and conditioning the image data for transmission, such as streaming, dividing into packets, and/or compressing the image data.

In some embodiments, camera device 110 may include a camera not specifically designed to acquire 3D model data, such as a general-purpose digital camera, a camera equipped on a mobile device (e.g., a smart phone camera, a tablet camera, a laptop camera, etc.), a webcam, an action/sports camera, a panorama or 360-degree camera, or the like. In this case, images captured by camera device 110 may be aligned and combined based on feature recognition, image registration, machine learning, or other suitable techniques to convert multiple patches of 2D images into a 3D model.

In some embodiments, camera device 110 may include, separate from the image capturing device, a range device such as a light-based sensor (e.g., infra-red, laser, etc.) to acquire range/depth/distance information, which may be associated with 2D images captured by camera device 110 to create a 3D model.

As shown in the example of FIG. 1, camera device 110 may be installed on a stand 112. In some embodiments, stand 112 may include a tripod or similar supporting structures. Camera device 110 may be coupled to stand 112 through mounting, screwing, magnetically attaching, or any suitable mechanism to physically associate with stand 112.

In some embodiments, camera device 110 may be rigidly associated with stand 112. For example, the connection between camera device 110 and stand 112 may not allow significant movement of camera device 110 relative to stand 112. In some embodiments, camera device 110 may be flexibly associated with stand 112. For example, camera device 110 may be connected to stand 112 via a ball head, pan head, gimbal, CV-joint, track, slider, etc., to allow movement (e.g., tilt, pan, linear motion, or the like) of camera device 110 relative to stand 112. In some embodiments, motion of camera device 110 may be manually or remotely controlled by an operator. In some embodiments, motion of camera device 110 may be automatically controlled by a motorized mechanism and may be based on a predetermined routine or feedback from the captured information.

In some embodiment, stand 112 may be equipped with a motion mechanism to move around. For example, stand 112 may include wheels or similar structures to allow movement within in-door environment 102. Stand 112 may be motorized to propel itself. For example, stand 112 may be mounted on or integrated with a motorized base, cart, or robotic platform. In some embodiments, the motion of stand 112 may be controlled by an operator. In some embodiments, the motion of stand 112 may be automatically controlled based on a predetermined routine or feedback from the captured information.

In some embodiments, stand 112 may be omitted. For example, camera device 110 may be placed directly on any suitable surface or held by a user during an image capturing process.

The captured image data of in-door environment 102 may be processed by the data processing portion of system 100. In some embodiments, the data processing portion may include a cloud computing service (also referred to as cloud service or simply cloud) 140 comprising one or more servers 142 (hereinafter collectively referred to as server 142). Image data captured by camera device 110 may be transmitted to cloud 140 via a communication channel 114. In some embodiments, communication channel 114 may include a wired or physical connection, such as a data cable or card reader. In some embodiments, communication channel 114 may include a wireless connection, such as a wireless local area network (WLAN) connection, Bluetooth connection, telecommunication link (e.g., 3G, 4G, 5G, etc.), or the like. In some embodiments, when mobile device 111 is used to process the image data captured by camera device 110, mobile device 111 may be part of the data processing portion. In this case, communication channel 114 may be between mobile device 111 and cloud 140 in addition to or instead of between camera device 110 and cloud 140.

Server 142 may include data processing devices to process the image data received from camera device 110 and/or mobile device 111. For example, the image data may include multiple images of in-door environment 102 captured at multiple locations and/or multiple shooting angles. The multiple images may include high-definition color photos, sometimes with multiple exposure levels, of features in the in-door environment 102. The multiple images may also include or be associated with 3D range data (e.g., 3D point cloud data) and/or geographical information (e.g., GPS information) of in-door environment 102. Based on the image data, server 142 may map the features contained in the images as well as image textures and details to a 3D model representing the in-door environment 102 using techniques such as automatic model creation, intelligent hole filling, automatic data extraction, and high-dynamic range (HDR) optimization. In this way, in-door environment 102 can be reconstructed in virtual reality to allow users to explore, examine, and experience the features of in-door environment 102 in high fidelity without being physically present therein. In some embodiments, part or all of the data processing may be performed by mobile device 111. For example, mobile device 111 and server 142 may work in tandem to process the image data captured by camera device 110.

Viewing or touring the reconstructed in-door environment 102 can be accomplished through various ways, such as using a terminal device. For example, as shown in FIG. 1, a user 122 may use a terminal device 120 to view or virtually tour the VR version of the in-door environment (referred to as VR environment 126) displayed on terminal device 120. In some embodiments, terminal device 120 may communicate with cloud 140 to exchange information about displaying VR environment 126. For example, data related to the VR environment 126, such as the 3D model of in-door environment 102, color information, texture information, spatial relationship among various features/objects, and one or more default view points, view angles, and/or field of views may be transmitted from cloud 140 to terminal device 120 via a communication channel 124. User 122 may manipulate the view point, view angle, and field of view in the VR environment 126 to explore various features, for example to virtually "move" along a route to change the view point, pan/tilt to change the view angle, and zoom in/out to change the field of view. These manipulations may be fed back to cloud 140 via communication channel 124 to update the content of the VR environment 126 displayed on terminal device 120. Communication channel 124 may include any suitable wired or wireless connections between cloud 140 and terminal device 124, such as a broadband connection (e.g., via WLAN, LAN, and/or short-range communication links such as Bluetooth), a telecommunication link (e.g., 3G, 4G, 5G, etc.), or the like.

VR environment 126 displayed on terminal device 120 may be enriched with various enrichment data. For example, audio description or guidance may be added to VR environment 126 to enrich the user experience. The audio description or guidance may include a recorded voice guidance to introduce features of in-door environment 102, background information, or other information to assist user 122 in understanding the features or characteristics of in-door environment 102. In another example, video demonstration may be provided to showcase certain features displayed in VR environment 126. In yet another example, one or more spatial operations altering the view of the VR environment 126 may be added to direct the user's attention to specific aspects of VR environment 126. Exemplary spatial operations may include panning, tilting, zooming, sliding or moving in any suitable manner, etc. These multimedia contents enrich the VR environment 126 by engaging user 122 with additional layers of interactions, thereby improving the user experience.

Enrichment data such as audio description, video demonstration, and spatial operations altering the view of the VR environment 126 may be added by a user 132. In some embodiments, user 132 may have a role falling within a predetermined authorization group, such as a realtor, an owner or manager of a real estate property, or the like. User 132 may operate a terminal device 130 to create enrichment data or upload pre-created enrichment data to cloud 140. For example, terminal device 130 may display a 3D VR environment 136 (also referred to as VR environment 136 or environment 136 for simplicity) that may be similar to VR environment 126 but may include additional interface elements configured for creating or adding enrichment data.

When user 132 is navigating through VR environment 136, a user indicator, which may or may not be visible in VR environment 136, may be used to determine the field of view depicted on terminal device 130. For example, the user indicator may be represented by a view point within VR environment 136 simulating the position where user 132 is virtually located within VR environment 136 and the direction toward which user 132 faces. In some embodiments, whether the user indicator is within VR environment 136 or not may indicate whether user 132 engages or experiences VR environment 136.

Terminal device 130 may communicate with cloud 140 via communication channel 134, which may be similar to communication channel 124. Enrichment data created or uploaded by user 132 may be transmitted to cloud 140 via communication channel 134. After receiving the enrichment data, cloud 140, through server 142, may update the 3D model of in-door environment 102 stored thereon by adding the enrichment data, and provide the updated VR environment 126 to user 122.

Figure 2:
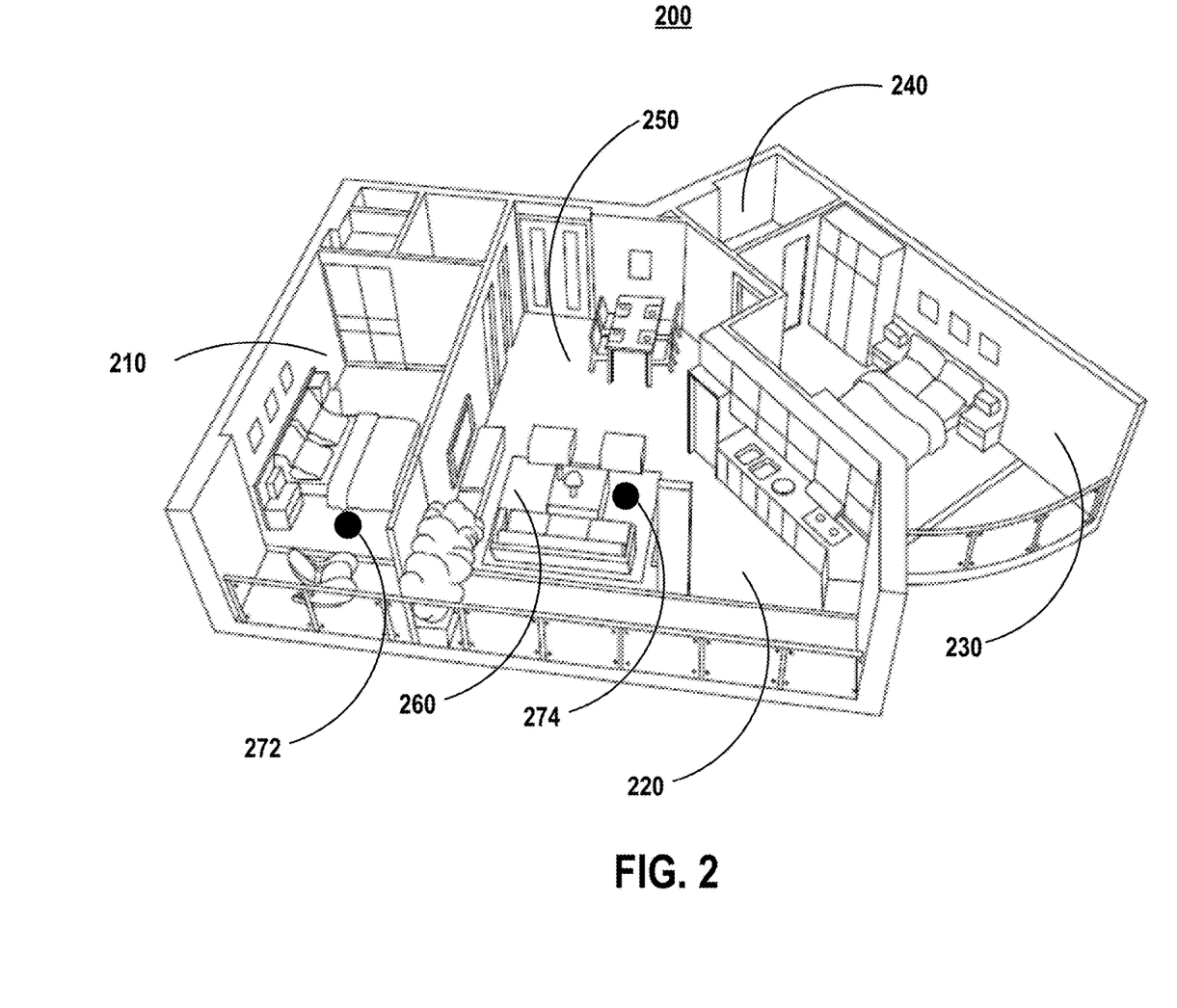
FIG. 2 illustrates an exemplary three-dimensional (3D) VR environment, according to embodiments of the disclosure.

FIG. 2 illustrates an exemplary 3D VR environment 200, according to embodiments of the disclosure. As shown in FIG. 2, 3D VR environment 200 may simulate or represent a residential unit, such as an apartment or house floor. It is noted that 3D VR environment 200 is not limited to the example shown in FIG. 2. Rather, 3D VR environment 200 may include a VR representation of any in-door space or environment. Referring to FIG. 2, 3D VR environment 200 may include one or more functional spaces, such as 210, 220, 230, 240, 250, and 260. As used herein, a functional space refers to an enclosed or partially enclosed space that is associated with a particular function. In some cases, a functional space may correspond to a room. For example, functional space 210 may correspond to a first bedroom, and functional space 230 may correspond to a second bedroom. In some cases, a functional space may correspond to an enclosed or partially enclosed space within or adjacent to a room. For example, functional space 240 may correspond to a closet. In some cases, a function space may correspond to an area that is generally used for a specific purpose. For example, functional space 220 may correspond to a kitchen area, functional space 250 may correspond to a dining area, and functional space 260 may correspond to a living room. Although functional spaces 220, 250, and 260 may share the same room (e.g., an enclosed area), they may be considered as different functional spaces due to their different functions.

Figure 3:
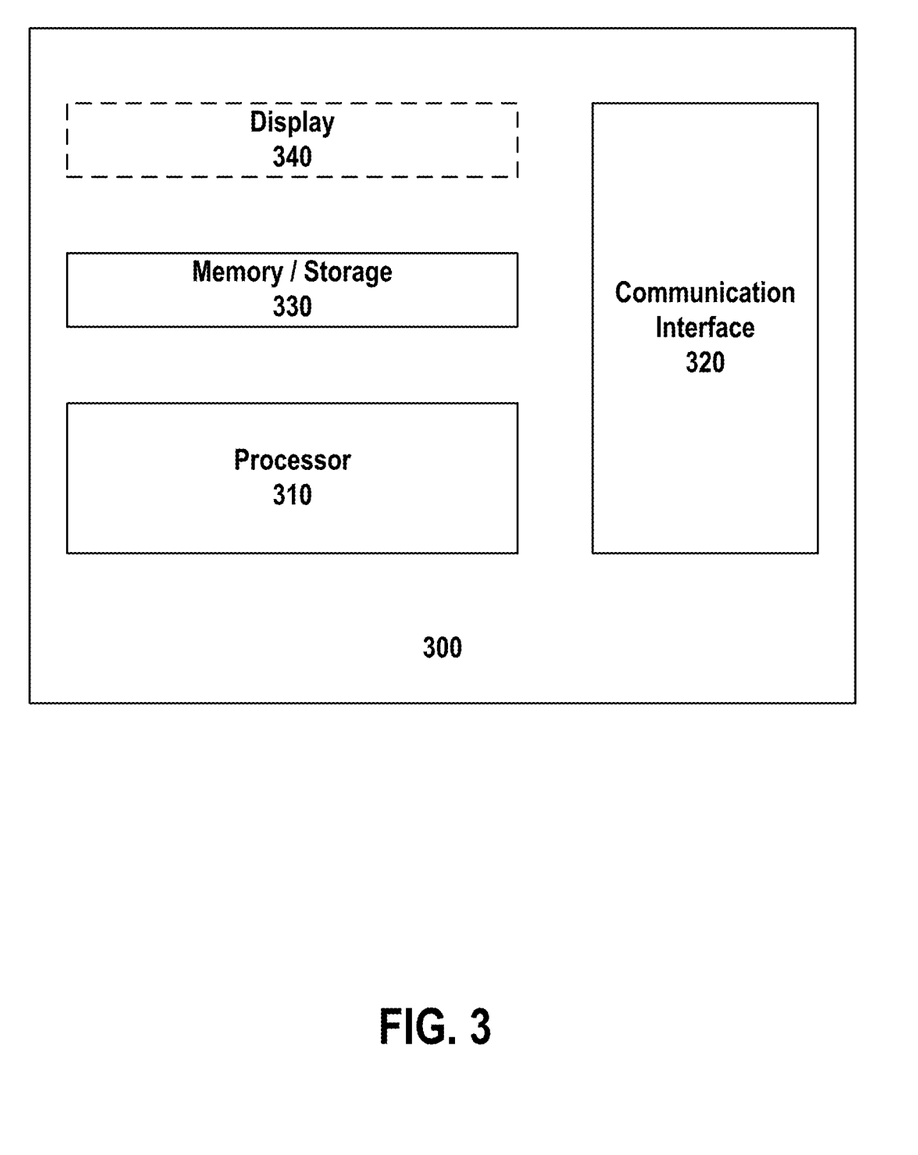
FIG. 3 illustrates a block diagram of an exemplary computer system configured to provide, display, or enrich an in-door VR tour, according to embodiments of the disclosure.

FIG. 3 illustrates a block diagram of an exemplary computer system 300 configured to implement various functions disclosed herein. For example, computer system 300 may be configured as server 142 to create or reconstruct VR environment 126. In another example, computer system 300 may be configured as terminal device 120 or 130 to display or enrich VR environment 126/136. As shown in FIG. 3, computer system 300 may include a processor 310, a communication interface 320, a memory/storage 330, and a display 340. Memory/storage 330 may be configured to store computer-readable instructions that, when executed by processor 310, can cause processor 310 to perform various operations disclosed herein. Memory 330 may be any non-transitory type of mass storage, such as volatile or non-volatile, magnetic, semiconductor-based, tape-based, optical, removable, non-removable, or other type of storage device or tangible computer-readable medium including, but not limited to, a ROM, a flash memory, a dynamic RAM, and a static RAM.

Processor 310 may be configured to perform the operations in accordance with the instructions stored in memory 330. Processor 310 may include any appropriate type of general-purpose or special-purpose microprocessor, digital signal processor, microcontroller, or the like. Processor 310 may be configured as a separate processor module dedicated to performing one or more specific operations disclosed herein. Alternatively, processor 310 may be configured as a shared processor module capable of performing other operations unrelated to the one or more specific operations disclosed herein.

Communication interface 320 may be configured to communicate information between computer system 300 and other devices or systems. For example, communication interface 320 may include an integrated services digital network (ISDN) card, a cable modem, a satellite modem, or a modem to provide a data communication connection. As another example, communication interface 320 may include a local area network (LAN) card to provide a data communication connection to a compatible LAN. As a further example, communication interface 320 may include a high-speed network adapter such as a fiber optic network adaptor, 10G Ethernet adaptor, or the like. Wireless links can also be implemented by communication interface 320. In such an implementation, communication interface 320 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 320 may also include various I/O devices such as a keyboard, a mouse, a touchpad, a touch screen, a microphone, a camera, a biosensor, etc. User 122/132 may input data to terminal device 120/130 through communication interface 320.

Display 340 may be integrated as part of computer system 300 or may be provided as a separate device communicatively coupled to computer system 300. Display 340 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, display device 340 may include a VR goggle, a pair of VR glasses, or other similar devices that provide immersive VR experience. For example, VR environment 126/136 may be displayed on display 340. In some embodiments, display 340 may be integrated as part of communication interface 320.

Figure 4:
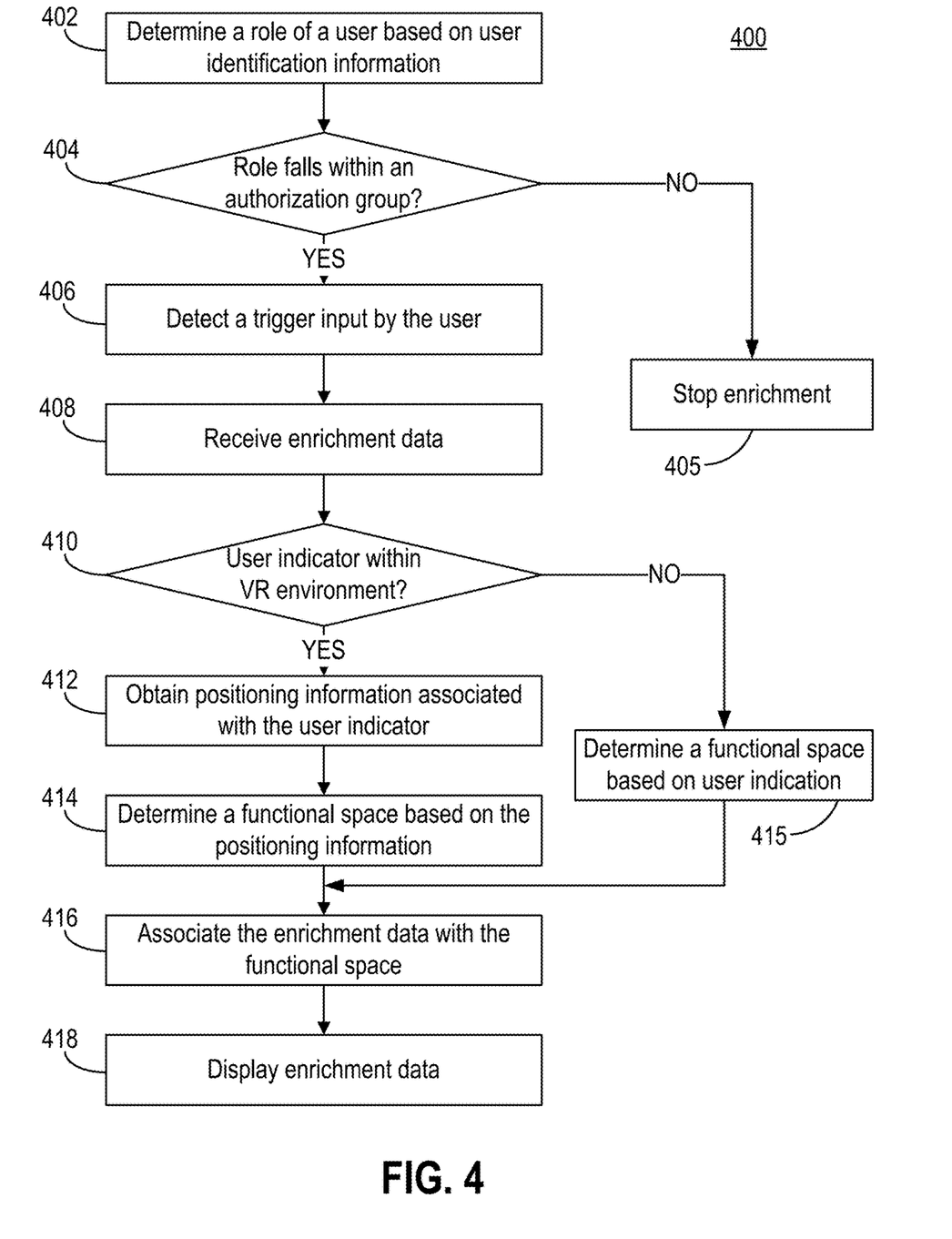
FIG. 4 is a flow chart of an exemplary method for enriching an in-door VR tour, according to embodiments of the disclosure.
Figure 5:
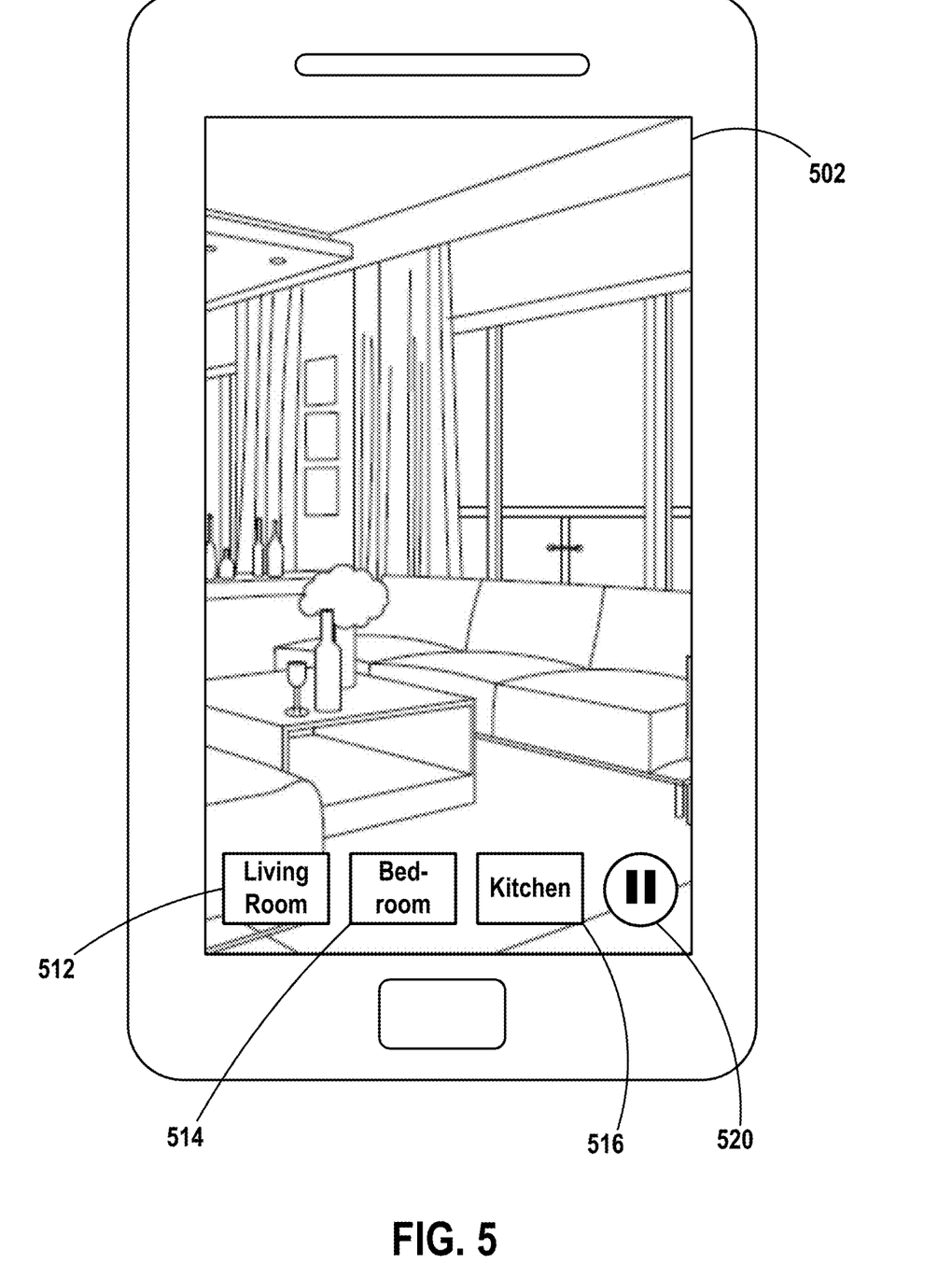
FIG. 5 illustrates an exemplary user interface for displaying or enriching an in-door VR tour, according to embodiments of the disclosure.

FIG. 4 illustrates a flowchart of an exemplary method 400 for enriching a VR tour of an in-door environment (e.g., in-door environment 102), according to embodiments of the disclosure. In some embodiments, method 400 may be implemented by server 142. However, method 400 is not limited to that exemplary embodiment and may be implemented by terminal device 120/130 or jointly by server 142 and terminal device 120/130. As discussed above, server 142 and/or terminal device 120/130 may be implemented by computer system 300. Method 400 may include steps 402-418 as described below. It is to be appreciated that some of the steps may be optional to perform the disclosure provided herein. Further, some of the steps may be performed simultaneously, or in a different order than shown in FIG. 5 illustrates an exemplary user interface for displaying or enriching an in-door VR tour. Method 400 will be de discussed together with FIGS. 3 and 5.

In step 402, processor 310 may determine a role of a user based on user identification information. For example, processor 310 may obtain user identification information based on, for example, log on information such as user name or ID, a user profile, and biological information such as fingerprint, voice, and iris information. Based on the user identification information, processor 310 may determine the role of the user. The role may include, for example, a property viewer, a potential buyer/renter, a realtor, a property owner, a property manager, etc. For example, user 122 (shown in FIG. 1) may be a property viewer or potential buyer/renter, while user 132 may be a realtor, a property owner, or a property manager. Different roles may by provided with different features. For example, the feature of enriching a VR tour may be provided to the realtor, owner, and/or manager of a property, but may not be provided to general viewers.

In step 404, processor 310 may determine whether the role determined in step 402 falls within a predetermined authorization group. For example, for a given property, the authorization group may include the realtor, owner, and/or manager of the property. In another example, the authorization group may include those users who have been authorized to provided enrichment data. If processor 310 determines that the role does not fall within the predetermined authorization group (the NO branch following step 404), then method 400 proceeds to step 405, in which the enrichment process may be stopped.

If processor 310 determines that the role falls within the predetermined authorization group (the YES branch following step 404), then method 400 proceeds to step 406, in which processor 310 may detect a trigger input by the user. In some embodiments, the trigger may include a pressing of holding of a predetermined button or key displayed to the user. For example, referring to FIG. 5, processor 310 may detect the trigger when a user (e.g., user 132) presses or holds a record button 520. In another example, processor 310 may detect the trigger when a user (e.g., user 132) presses or holds one of the functional space buttons 512, 514, and 516. It is noted that the buttons shown in FIG. 5 are exemplary only. Other forms of triggering mechanisms can also be used to initiate the enrichment data input process.

In response to the detection of the trigger, method 400 proceeds to step 408, in which processor 310 may receive enrichment data input by the user through communication interface 320. The enrichment data may take various forms. For example, the enrichment data may include an audio stream containing audio description of in-door environment 102. In another example, the enrichment data may include a video stream containing video demonstration of in-door environment 102. In yet another example, the enrichment data may include one or more spatial operations altering a view associated with the in-door VR tour, such as panning, tilting, zooming, sliding or moving in any suitable manner, etc. The enrichment data may be input through a microphone, a camera, operations on a touch screen, or any suitable manner provided by communication interface 320.

In step 410, processor 310 may determine whether a user indicator is within a 3D VR environment associated with the in-door VR tour. As discussed above, the user indicator may represent the user in the in-door VR tour and can be used to determine the field of view depicted on terminal device 130 when user 132 is navigating through VR environment 136. The user indicator may or may not be visible in VR environment 136. For example, the user indicator may be represented by a view point within VR environment 136 simulating the position where user 132 is virtually located within VR environment 136 and the direction toward which user 132 faces. In some embodiments, whether the user indicator is within VR environment 136 or not may indicate whether user 132 engages or experiences VR environment 136.

If processor 310 determines that the user indicator is within VR environment 136 (the YES branch following step 410), method 400 proceeds to step 412, in which processor 310 may obtain positioning information associated with the user indicator. In some embodiments, the positioning information may include a spatial location of the user indicator within a VR environment (e.g., VR environment 136) associated with the in-door VR tour. For example, processor 310 may obtain the spatial location of the user indicator based on the position of the user indicator relative to other structures in the 3D model of the in-door environment. In some embodiments, the positioning information may include a field of view of the user indicator within the VR environment. For example, processor 310 may determine the position of the user indicator based on the current field of view experienced by the user indicator (e.g., displayed on terminal device 130).

In step 414, processor 310 may determine a functional space based on the positioning information. For example, based on the current location of the user indicator, processor 310 may determine in which functional space the user indicator is currently present. In another example, processor 310 may determine the functional space the user (e.g., user 132) is currently viewing (e.g., experiencing the VR tour) on terminal device 130. Referring to FIG. 2, when the positioning information indicates that the user indicator is located in position 272, processor 310 may determine that user indicator is in functional space 210 (e.g., bedroom). In another example, when the positioning information indicates that the user indicator is located in position 274, processor 310 may determine that user indicator is in functional space 260 (e.g., living room).

If, in step 410, processor 310 determines that the user indicator is not within VR environment 136 (the NO branch following step 410), method 400 proceeds to step 415, in which processor 310 may determine the functional space based on user indication. For example, user 132 may indicate which functional space is selected for adding enrichment data. Take the exemplary interface shown in FIG. 5 for example, user 132 may click one of the buttons 512, 514, or 516 to indicate which one of these functional spaces is to be associated with enrichment data.

In step 416, processor 310 may associate the enrichment data with the functional space determined in step 414 or 415. In the case of making association based on the result of step 414, processor 310 may associate the enrichment data created by user 132 while viewing or experiencing a functional space with that functional space. In this way, the added enrichment data may be automatically associated with the corresponding functional space. For example, when user 132 is "walking through" (e.g., in VR sense) a bedroom during a VR tour, the user, who may be a realtor, may introduce to the potential buyers features of the bedroom by making a voice recording (e.g., in the form of an audio stream). Processor 310 may determine that user 132 is positioned in the bedroom while making the voice recording based on the positioning information of the user indicator, and automatically associate the voice recording with the bedroom. In another example, user 132 may create a video demo of how to operate an appliance in the kitchen during a VR tour. Processor 310 may determine that the functional space corresponding to the creation of the video demo is the kitchen and automatically associate the video demo with the kitchen. In a further example, user 132 may change the field of view to focus on a ceiling light during a VR tour of the living room. Processor 310 may identify living room as the proper functional space relevant to the spatial operation of changing the field of view, and automatically associate the changing of the field of view with the living room.

In the case of making association based on the result of step 415, user 132 may upload one or more enrichment data sets, each may be identified by a reference number (e.g., number 1 to 5). Based on user indication or a preset rule, processor 310 may establish mapping relationship between the uploaded enrichment data set and corresponding functional space. For example, enrichment data set 1 may be mapped to functional space 210 (shown in FIG. 2), enrichment data set 2 may be mapped to functional space 220, etc.

In step 418, processor 310 may display the enrichment data to users who wish to take a VR tour. For example, processor 310 may order multiple enrichment data sets according to their associated functional spaces and display a list of options on the user interface of a terminal device (e.g., terminal device 120). For example, buttons 512-516 shown in FIG. 5 are examples of enrichment data displayed on a terminal device. In some embodiments, user 122 may select a button to play the enrichment data, knowing that the enrichment data to be played are associated with a particular functional space. In some embodiments, a button corresponding to a functional space may appear when user 122 is within (in VR sense) that functional space. In the way, enrichment data can be classified and organized according to their relevant functional space, improving the user experience during a VR tour.

Figure 6:
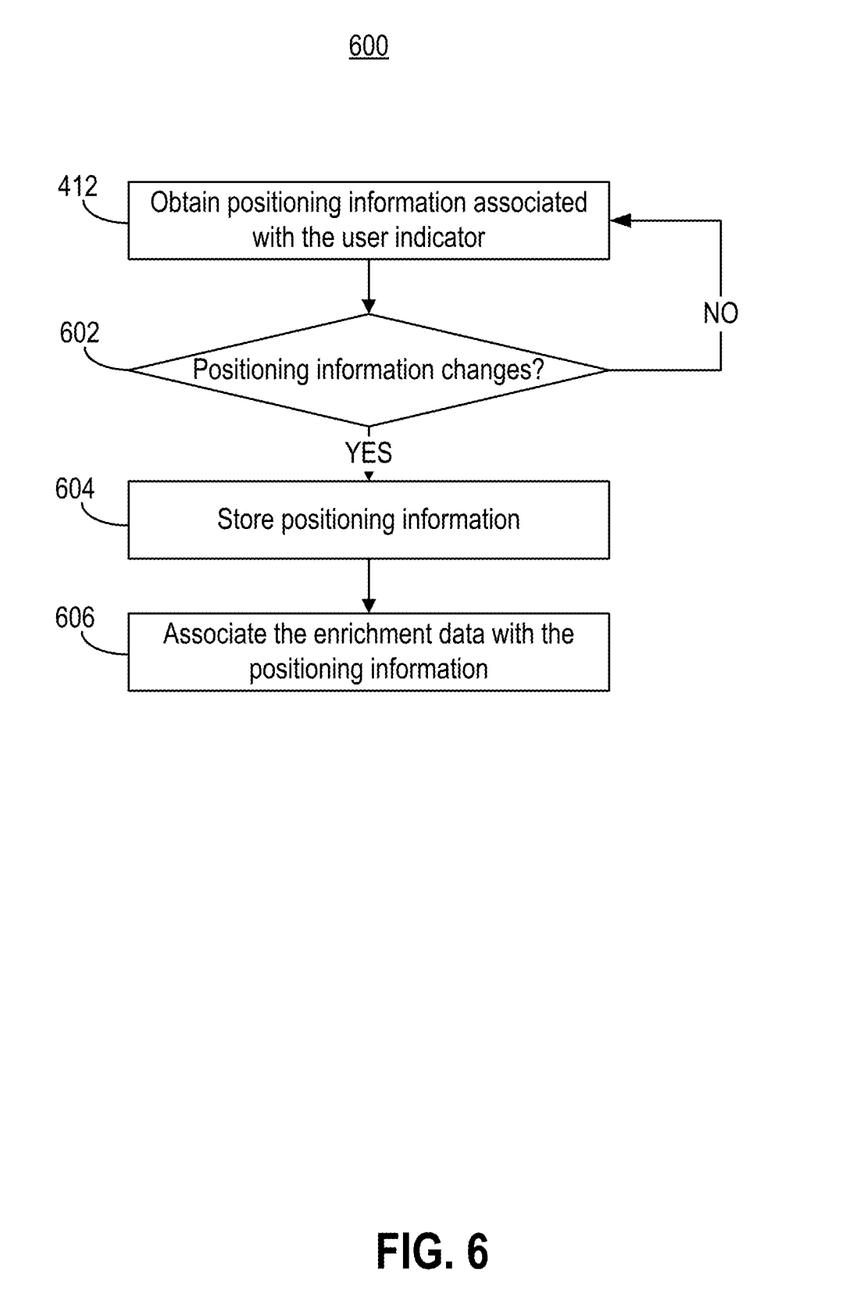
FIG. 6 is a flow chart of another exemplary method for enriching an in-door VR tour, according to embodiments of the disclosure.

FIG. 6 is a flow chart of an exemplary method 600 for associating enrichment data with positioning information, according to embodiments of the disclosure. Method 600 may start from step 412 of method 400. Steps prior to step 412 of method 400 may or may not be present in method 600. Referring to FIG. 6, following step 412, processor 310 may detecting whether the positioning information changes in step 602. For example, processor 310 may repeatedly determine the positioning information and compare whether a change occurs. In another example, processor 310 may detect a difference between consecutive positioning information. When the difference exceeds a threshold, then processor 310 may determine that a change of the positioning information occurs. If no change is detected (the NO branch following step 602), then method 600 loops back to step 412 to repeatedly determine the positioning information. If, on the other hand, a changes is detected (the YES branch following step 602), then method 600 proceeds to step 604, in which processor 310 may store the positioning information in memory/storage 330. In step 606, processor 606 may associate the enrichment data with the stored positioning information. In this way, the enrichment data can be more precisely associated with the positioning information. For example, a first voice description describing the sofa can be associated with the position of the sofa, while a second voice description describing the coffee table can be associated with the position of the coffee table, even though the sofa and coffee table may both in the same functional space (e.g., living room).

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A system for providing an in-door virtual reality (VR) tour, comprising:
    a communication interface configured to receive input from a user;
    a memory storing computer-readable instructions; and
    at least one processor coupled to the communication interface and the memory, wherein the computer-readable instructions, when executed by the at least one processor, cause the at least one processor to perform operations comprising:
        detecting, through the communication interface, a trigger input by the user;
        obtaining user identification information;
        determining a role of the user based on the user identification information;
        determining whether the role of the user falls within a predetermined authorization group comprising at least one of a realtor, a property owner, or a property manager;
        in response to the detection of the trigger and a determination that the role of the user falls within the predetermined authorization group, receiving, through the communication interface, enrichment data input by the user, wherein the enrichment data comprise a video stream containing a video demonstration of an in-door environment;
        determining a functional space based on a user indicator representing the user in the in-door VR tour;
        associating the enrichment data with the functional space;
        determining positioning information associated with the user indicator;
        associating the enrichment data with the positioning information; and
        controlling a display to display the enrichment data.

2. The system of claim 1, wherein the operations comprise:
    determining whether the user indicator is within a three-dimensional (3D) VR environment associated with the in-door VR tour;
    in response to a determination that the user indicator is within the 3D VR environment, obtaining positioning information associated with the user indicator; and
    determining the functional space based on the positioning information.

3. The system of claim 2, wherein the operations comprise:
    in response to a determination that the user indicator is not within the 3D VR environment, determining the functional space based on an indication provided by the user.

4. The system of claim 2, wherein the trigger comprises a pressing or holding of a predetermined button displayed to the user.

5. The system of claim 1, wherein the operations comprise:
    repeatedly determining the positioning information;
    detecting whether the positioning information changes; and
    storing the positioning information in the memory in response to a detection of a change in the position information.

6. The system of claim 1, wherein the positioning information comprises at least one of:
    a spatial location of the user indicator within a three-dimensional (3D) VR environment associated with the in-door VR tour; or
    a field of view of the user indicator within the 3D VR environment.

7. The system of claim 1, wherein the enrichment data comprise an audio stream or at least one spatial operation altering a view associated with the in-door VR tour.

8. A method for enriching an in-door virtual reality (VR) tour, comprising:
    detecting, through a communication interface, a trigger input by a user;
    obtaining user identification information;
    determining a role of the user based on the user identification information;
    determining whether the role of the user falls within a predetermined authorization group comprising at least one of a realtor, a property owner, or a property manager;
    in response to the detection of the trigger and a determination that the role of the user falls within the predetermined authorization group, receiving, through the communication interface, enrichment data input by the user, wherein the enrichment data comprise a video stream containing a video demonstration of an in-door environment;
    determining, by at least one processor, a functional space based on a user indicator representing the user in the in-door VR tour;
    associating, by the at least one processor, the enrichment data with the functional space;
    determining positioning information associated with the user indicator;
    associating the enrichment data with the positioning information; and
    displaying the enrichment data.

9. The method of claim 8, comprising:
    determining whether the user indicator is within a three-dimensional (3D) VR environment associated with the in-door VR tour;
    in response to a determination that the user indicator is within the 3D VR environment, obtaining positioning information associated with the user indicator; and
    determining the functional space based on the positioning information.

10. The method of claim 9, comprising:
    in response to a determination that the user indicator is not within the 3D VR environment, determining the functional space based on an indication provided by the user.

11. The method of claim 9, wherein the trigger comprises a pressing or holding of a predetermined button displayed to the user.

12. The method of claim 8, comprising:
repeatedly determining the positioning information;
detecting whether the positioning information changes; and
storing the positioning information in response to a detection of a change in the position information.

13. The method of claim 8, wherein the positioning information comprises at least one of:
- a spatial location of the user indicator within a three-dimensional (3D) VR environment associated with the in-door VR tour; or
- a field of view of the user indicator within the 3D VR environment.

14. The method of claim 8, wherein the enrichment data comprise an audio stream or at least one spatial operation alerting a view associated with the in-door VR tour.

15. A non-transitory computer-readable medium storing instructions that, when executed by at least one processor, cause the at least one processor to perform a method for enriching an in-door virtual reality (VR) tour, the method comprising:
- detecting, through a communication interface, a trigger input by a user;
- obtaining user identification information;
- determining a role of the user based on the user identification information;
- determining whether the role of the user falls within a predetermined authorization group comprising at least one of a realtor, a property owner, or a property manager;
- in response to the detection of the trigger and a determination that the role of the user falls within the predetermined authorization group, receiving, through the communication interface, enrichment data input by the user, wherein the enrichment data comprise a video stream containing a video demonstration of an in-door environment;
- determining a functional space based on a user indicator representing the user in the in-door VR tour;
- associating the enrichment data with the functional space;
- determining positioning information associated with the user indicator;
- associating the enrichment data with the positioning information; and
- controlling a display to display the enrichment data.

* * * * *